Oct. 19, 1965 P. J. NATHO 3,212,516
PRESSURE REGULATOR WITH CORRELATED RELIEF VALVE
Original Filed Sept. 10, 1962 3 Sheets-Sheet 1
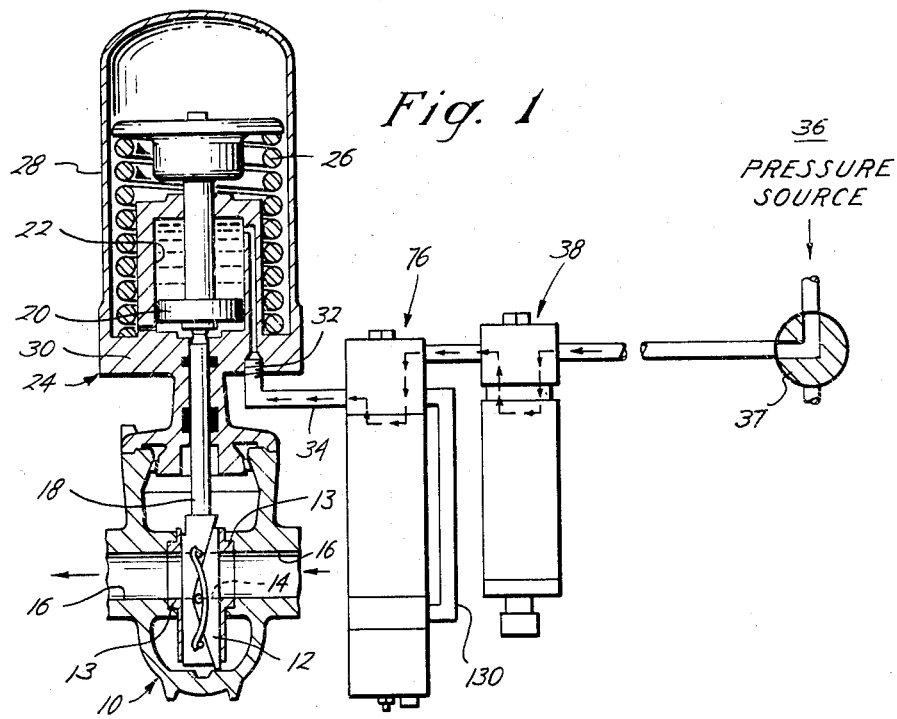
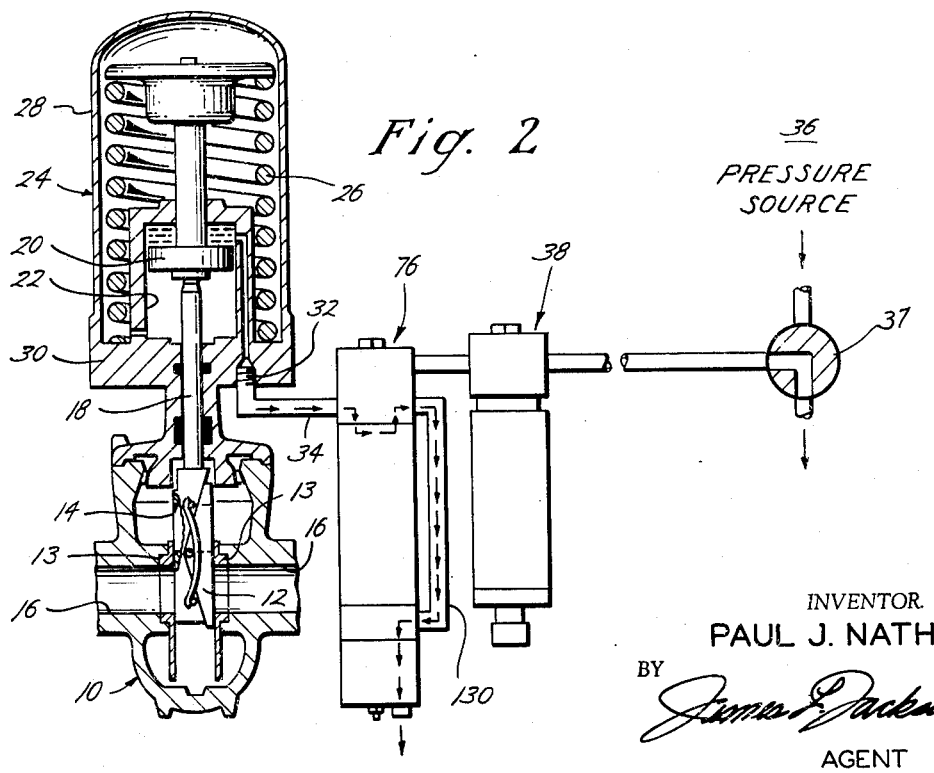
INVENTOR.
PAUL J. NATHO
AGENT

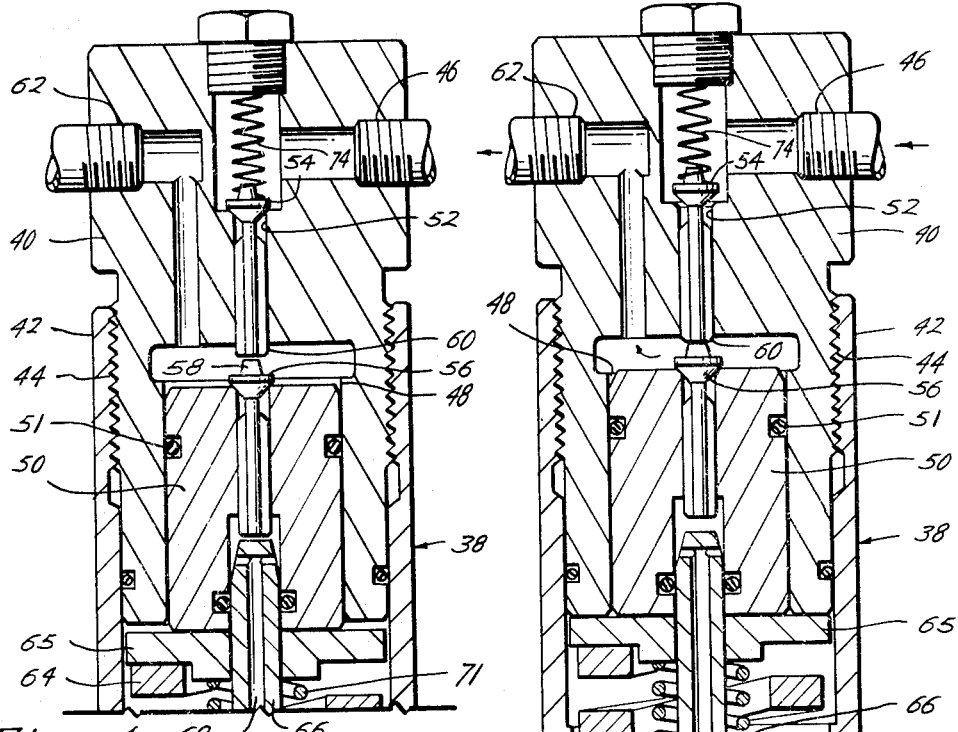
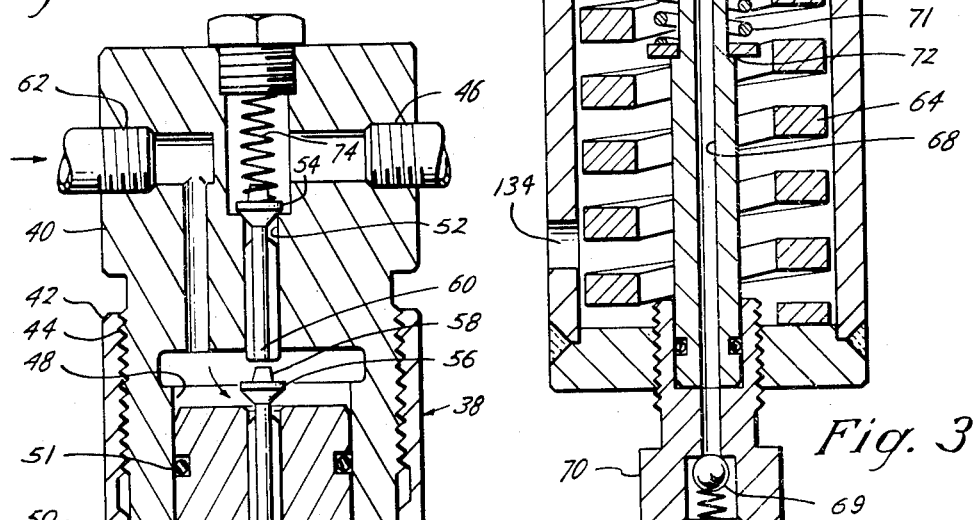
Fig. 4
Fig. 5
Fig. 3
INVENTOR.
PAUL J. NATHO
BY
AGENT

INVENTOR.
PAUL J. NATHO

United States Patent Office 3,212,516
Patented Oct. 19, 1965

3,212,516
PRESSURE REGULATOR WITH CORRELATED
RELIEF VALVE
Paul J. Natho, Houston, Tex., assignor to ACF Industries,
Incorporated, New York, N.Y., a corporation of New
Jersey
Original application Sept. 10, 1962, Ser. No. 222,275.
Divided and this application June 11, 1964, Ser. No.
374,468
7 Claims. (Cl. 137—116.5)

This application is a division of my copending application Serial Number 222,275 filed on September 10, 1962.

This invention relates to a system for the control of an offshore or other remotely located hydraulically operated valve and the essential components therefor.

The discovery of petroleum products in offshore and other isolated locations has resulted in changes of technology in the completion of the well. In some instances, the wellhead control units are located above the surface of the water and the well is completed very much similar to a well located on land. However, in such instances, due to the inaccessibility of the location, the trend has been toward the use of automated equipment which can be automatically controlled from a central point. In other cases, the wellhead control unit is located under the surface of the water, and in such cases it is necessary to use a new technology to complete the well. When the wellhead completion unit is located under the water, the wellhead and control system may be encased in a canister isolating it from the sea water. It is desirable that the control valves in the underwater Christmas tree be provided with automatic fail-safe hydraulic operators which permit automated control of the well. In both cases, the hydraulic lines to the automated operator may extend two or three miles from a control point. Due to the pressure of wells, it has been customary to use hydraulic operators designed to operate on a pressure of approximately 1000 p.s.i. Inasmuch as there is a large pressure drop in a hydraulic line of considerable length, it has been found necessary to provide a large line to the operator even though a large line is expensive. If a small line is used, line friction will result in a low rate of flow and a large pressure drop, and consequently the initial pressure has to be considerably greater than the pressure required at the operator to obtain a suitable flow rate, then when the hydraulic operator reaches the end of its stroke and no more fluid is required, the initial pressure will be developed which oftentimes is too great for the operator. Also, it is customary to use a single line system and rely on spring pressure to move the valve to the other position. In using long lines it is difficult for the return spring in the operator to develop sufficient pressure to force back the hydraulic fluid in the short time usually desired for the operation of the valve since line friction in the line reduces the speed of movement of the hydraulic fluid. In order to overcome the objections of a small line, and the expense of a large line, the present invention discloses a system which permits the utilization of a single small line without the possibility of overpressurization of the hydraulic operator to be controlled and which permits the utilization of a spring to operate the valve.

In order to accomplish the above, the control system of the present invention is comprised of a hydraulically operated valve requiring a relatively high pressure, for example in the neighborhood of 1000 p.s.i., to operate the valve in one direction and having a spring of sufficient magnitude to move the valve to the other position upon release of pressure, a single small hydraulic line extending from the operator, a pressure source capable of delivering at the operator a pressue of at least 1000 p.s.i., a pressure regulator in the hydraulic line receiving the pressure from the pressure source and transmitting a constant pressure to the hydraulic operator. The pressure regulator has a relief valve to relieve any excess pressure. Also provided is a hydraulic unloading valve between the regulator and the hydraulic operator which receives the pressure from the regulator and transmits it to the operator while the pressure in the line is increased or maintained at the selected operating pressure and which dumps the hydraulic fluid rather than returning it to the pressure source when the pressure in the line is decreased below a preset pressure. By dumping the hydraulic fluid close to the hydraulic operator, it is possible to return the valve to the other position in a short period of time without the utilization of an extremely large and heavy spring.

In attempting to obtain units for the system, no commercial pressure regulator which included an internal relief adaptable for high pressure hydraulic service or a hydraulic unloading valve suitable for high pressure hydraulic service could be found. Accordingly, these two units had to be developed in order to permit the construction of the improved control system for automated valve operators.

The improved combined pressure regulator and internal relief valve is suitable for high pressure hydraulic service and permits the utilization of a single small line which has an originating pressure high enough to permit a relatively large pressure drop in the line and yet develop at the inlet of the regulator a pressure in excess of 1000 p.s.i. The regulator transmits a regulated pressure to the operator. When the operator has finished its stroke, the regulator prevents any buildup of excess pressure and retains the required pressure on the operator. Should the regulating valve leak to increase the pressure on the operator, the included pressure relief valve which is set at a pressure approximately 100 p.s.i. above the operating pressure will function to relieve the excess pressure. The valve is simple in construction and inexpensive to manufacture.

The improved hydraulic unloading or dump valve delivers the pressure received from the pressure regulator to the operator. As long as the pressure is maintained on the inlet side of the dump valve, the fluid pressure is maintained on the operator and the dump port to the sea remains closed. However, as soon as the pressure is lowered beyond a set point for any reason, the discharge valve opens and permits the fluid in the operator to be discharged into the sea. Hydraulic fluid being incompressible, it is necessary to remove only a very small amount of fluid from the line to reduce the pressure thus eliminating the need for back flowing the fluid through the small line. The set dump pressure is still sufficient to prevent any operator piston movement and resulting fluid flow when the pressure is reduced from the 1000 p.s.i. A novel safety feature of this valve is that the fluid from the operator can return through the control line should the dump port to the sea become clogged for any reason. As previously mentioned, this would result in a very slow and undesirable valve operation only acceptable as an emergency measure. The unloading valve is simple in construction, inexpensive to manufacture and suitable for high pressure hydraulic service.

As can be seen from the above, the principal object of the present invention is to provide a pressure regulator for use in a control system for an automated hydraulic operator which permits the utilization of a single small line.

Another object is to provide an improved pressure regulator having an internal relief valve suitable for high pressure hydraulic service.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is a schematic diagram of the control system of the present invention, with the valve being operated in open position.

FIG. 2 is a view similar to FIG. 1 with the valve closed.

FIG. 3 is a cross section of the pressure regulator of the control system. The regulator valve being in the open position as in FIG. 1.

FIG. 4 is a fragmentary view of the valves of the pressure regulator illustrated in FIG. 3 showing the regulator valve being in the closed position.

FIG. 5 is a view similar to FIG. 4 with the relief valve being in the open position.

Figures 6, 7:
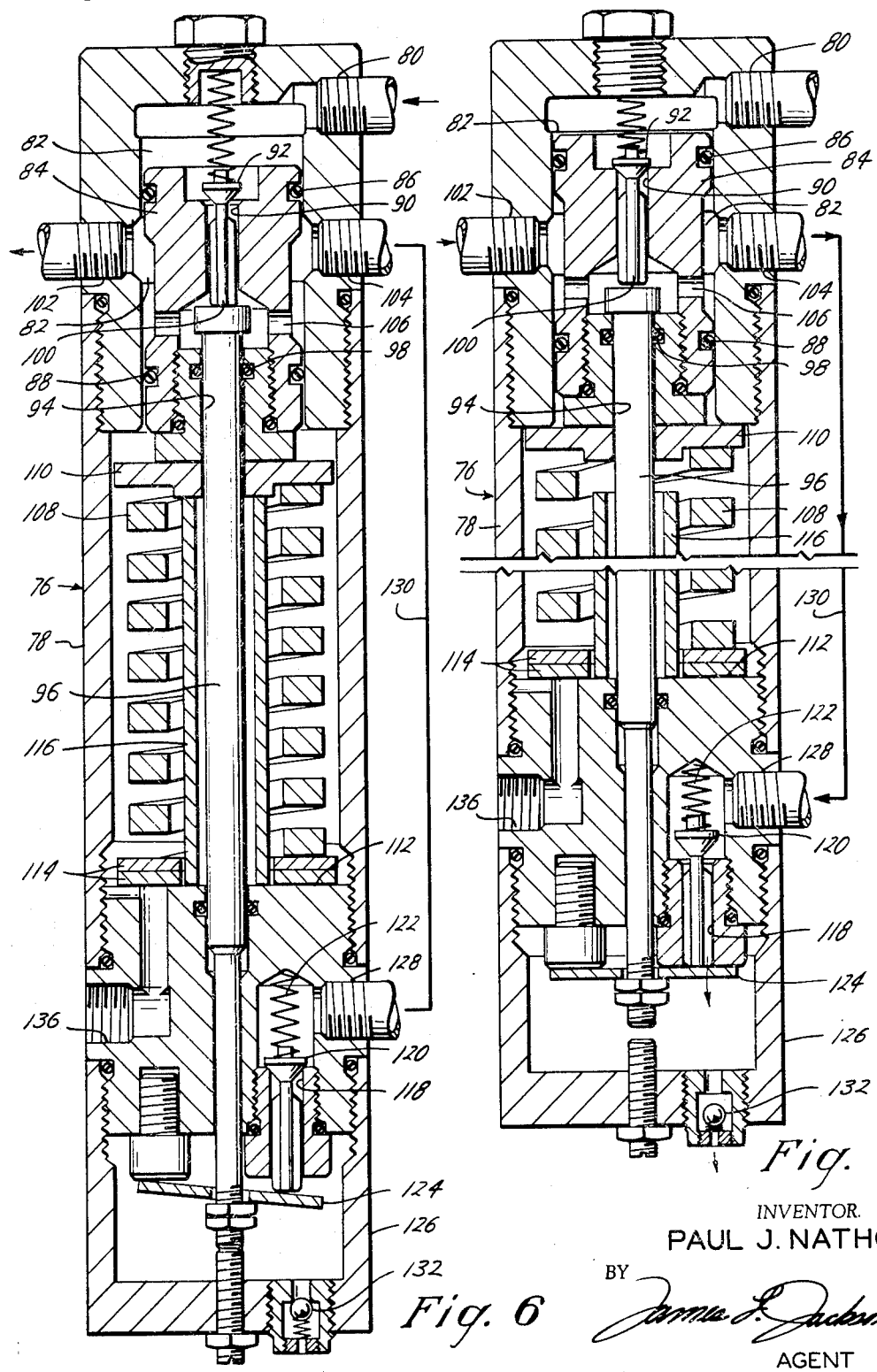
FIG. 6 is a cross section of the unloading valve in the position shown in FIG. 1.
FIG. 7 is a view similar to FIG. 6 with the discharge valve open similar to the position in FIG. 2.

For the purpose of illustrating the invention, a hydraulically operated reciprocating gate valve has been chosen since this type is the most commonly used valve for wellhead service, however, any other type of valve capable of being operated by a hydraulic operator may be controlled by the proposed system of this invention.

Referring now to the drawings, there is disclosed a fail safe closed hydraulically operated valve 10 which is controlled by the system of the present invention. The valve 10 is a reciprocating parallel expanding gate valve having a valve member 12 which reciprocates between the open and closed positions and expands in the fully open and fully closed position to form a seal with seats 13. The valve member has a port 14 in the upper portion thereof which in the open position is aligned with the inlet and outlet ports 16 of the valve. Extending from the valve member 12 is a stem 18 which is attached to a piston 20 located in a cylinder 22 of a hydraulic operator 24. Surrounding the cylinder 22 is a spring 26 which is attached to the outer end of the stem 18. Surrounding the spring 26 is a cover 28 which encloses the operator and seals all working parts from the elements. The operator 24 has a base 30 which is provided with a port 32 which leads to the upper side of the cylinder 22. Hydraulic pressure applied to the upper side of the cylinder overcomes the force of the spring 26 and moves the piston 20, stem 18 and valve member 12 axially inward so that the port 14 is aligned with the inlet and outlet ports 16. The valve 10 is then in the open position. Release of the pressure in the upper part of the cylinder 22 permits the spring 26 to extend thereby moving the piston 20, stem 18 and valve member 12 axially outward closing the valve. In addition to the power of the spring 26, the fluid flowing through the valve will also act on the valve member 12 assisting in moving the valve member 12 axially outward in the valve chamber. Attached to the port 32 in the base 30 of the operator 24 is a small hydraulic line 34. The line 34 extends to a pressure source 36 which is capable of delivering at the operator 24 hydraulic fluid having a pressure of at least sufficient magnitude to operate the valve 10. The pressure may be in the neighborhood of approximately 1000 p.s.i. which has been found to be sufficient in combination with the selected cylinder size to operate the valve against the flow of fluids flowing through the valve. Located close to the pressure source 36 is a three-way control valve 37 which will direct pressure to the operator 24 or will permit pressure from the operator to be discharged.

Positioned in the hydraulic line 34 near the operator 24 is a pressure regulator 38, see FIGS. 3, 4 and 5, which receives pressure from the pressure source 36 and transmits a regulated pressure. The housing of the pressure regulator is formed of two generally cylindrical sections 40-42 which are adjustably secured to each other by engagement of mating threads 44.

The first section 40 of the pressure regulator 38 has an inlet port 46 which is connected to the hydraulic line 34. The section 40 also has a cylindrical chamber 48 in which is positioned a piston 50 having a circumferential seal 51 with the wall of the cylindrical chamber 48. Connecting the inlet port 46 and cylindrical chamber 48 is a passage 52 in which is positioned a poppet regulator valve 54. Located in the piston 50 is a poppet relief valve 56 having a portion 58 which contacts the lower end 60 of the regulator valve 54. While it has been found desirable to use poppet valves for the regulator and relief valve, other types of valves used to seal a passage maybe used if desired. The section 40 is also provided with an outlet port 62 which is in communication with the cylindrical chamber 48 but is not in communication, except through the cylindrical chamber 48, with the inlet port 46. The second section 42 is provided with a heavy spring 64 which bears against the piston 50 through a spring plate collar 65. The magnitude of the spring 64 may be changed by the positioning of the sections 40–42 relative to each other. The compression of the spring 64 is so adjusted that the regulator valve 54 is normally held open until the pressure in the cylindrical chamber 48, and consequently at the outlet port 62, reaches the maximum pressure required to operate the hydraulic operator 24, see FIG. 3. When this pressure is reached, the pressure in the cylindrical chamber 48 has built up sufficiently to overcome the action of the spring 64; therefore, piston 50 has moved a sufficient amount that the portion 58 of the relief valve 56 which normally contacts the lower end of the regulator valve 54 moves out of contact with the regulator valve 54 and closes the regulator valve 54, see FIG. 4, allowing no further pressure to enter into the cylindrical chamber 48 and consequently flow out through the outlet port 62. Consequently, the pressure transmitted to the operator never exceeds the set limit. Also located in the section 42 is a central member 66 which contacts the relief valve 56 in the piston 50. The central member 66 is provided with a discharge passage 68. Therefore, if the regulator valve 54 leaks and hydraulic fluid flows into the cylindrical chamber 48 moving the piston 50 further inward, the relief valve 56 is contacted by the central member 66 and moved off its seat permitting any excess pressure to flow through the passage 68 in the central member 66 and outward of the valve, see FIG. 5. The passage 68 may be provided with a check valve 69 to permit flow outward of the valve only thereby preventing contamination from external fluid. The central member 66 is positioned in a threadingly engaged member 70 in the end of the section 42 so that the pressure at which the relief valve 56 will operate may be adjusted. The central member 66 will usually be so positioned so that any pressure in excess of 100 p.s.i. over the set operating pressure will cause the relief valve 56 to be opened relieving the excess pressure through the passage 68. To overcome packing friction, a small spring 71 may be positioned around the central member 66 contacting the collar 65. By contacting a small collar 72 positioned about the central member 66, the spring 71 maintains the central member 66 against its pocket in the threaded member 70 so that the central member 66 does not cause the relief valve 56 to be held open during pressure buildup thereby discharging pressure at a lower setting than desired. In order that the regulator valve 54 will close when the relief valve 56 is not contacting it, there is a spring 74 between the top of the regulator valve 54 and the plug in the end of the housing.

The regulator has two adjustments. One, by adjusting the sections 40–42 of the housing relative to each other the force of the spring 64 is adjusted. This controls the pressure at which the regulator valve 54 will close. The spring 64 resists the movement of the piston 50 and in effect regulates the pressure necessary for the piston 50 to move away from the regulator valve 54 whereby the end of the relief valve 56 will no longer contact the regulator valve 54 and will permit the regulator valve 54' to be closed by the spring 74. Accordingly, only pressure up to the set amount will flow through the cylindrical chamber 48 and out through the outlet port 62. Therefore, although the pressure source 36 may be located at a great distance and of necessity, because of the line friction, have an initial force much in excess to that required by the operator since the regulator 38 will cut off the pressure at the set amount. Accordingly, the regulator may be built for much higher pressure application than the operator. In the event that the regulator valve 54 should develop a leak, an additional saftey measure is provided in the regulator since if the pressure increases over a set amount, usually 100 p.s.i. above the necessary operating pressure, the relief valve 56 will contact the end of the central member 66 and be moved from its seat thereby relieving any excess pressure through the passage 58 in the central member. The relieving pressure may be adjusted by the positioning of the threaded member 70 which moves the central member 66 relative to the end of the relief valve 56 which in effect determines how much further the piston 50 has to move before the relief valve 56 is engaged by the central member 66, see FIG. 5.

Between the pressure regulator 38 and hydraulic operator 24 there is positioned an unloading valve 76 which receives the pressure from the pressure regulator 38 and transmits it to the hydraulic operator 24 while the pressure in the line 34 is being increased or maintained at the selected operating pressure and which will dump the hydraulic fluid from the operator 24 when the pressure in the line 34 is decreased beyond a set pressure, see FIGS. 6 and 7. This permits the spring 26 in the hydraulic operator 24 to move the valve member 12 to the other position in a short period of time since it does not have to overcome the line friction of the hydraulic fluid moving in a small line.

The unloading valve 76 is formed of a housing 78 having an inlet port 80 which receives the hydraulic line 34 coming from the outlet port 62 of the pressure regulator 38. In communication with the inlet port 80 is a cylindrical chamber 82 in which is positioned a piston 84 which is provided with a circumferential seal 86 sealing the inlet port 80 from the cylindrical chamber 82. The piston also has a second circumferential seal 88 which seals the cylindrical chamber from the remaining portion of the housing. The piston 84 has a central passage at the inlet port end in which is located a poppet valve member 92. The piston has a second central passage 94 in which is located a stem 96. A seal 98 is provided around the stem to prevent leakage of fluid into the remaining parts of the housing. The poppet valve member 92 has an extension 100 which can be contacted by the stem to move the poppet valve member 92 from its seat. As previously mentioned, poppet valves have been found desirable; however, other types of valves known in the art to seal a passage may be used. The housing has an outlet port 102 which communicates with the cylindrical chamber 82 but is sealed by the circumferential seal 86 from the inlet port 80. The housing also has a second port 104 which is also in communication with the cylindrical chamber 82 and is likewise sealed from the inlet port 80 by the circumferential seal 86. The piston 84 has passages 106 which communicate with the cylindrical chamber 82 adjacent the outlet passage 102 and the second port 104. Therefore, when the poppet valve 92 is opened, there will be flow from the inlet port 80 through the central passage 90 and out through the ports 102–104, see FIG. 6. Surrounding the stem 96 is a spring 108 which bears against the end of the piston 84 through a spring plate 110. The other end of the spring 108 bears against a portion 112 of the housing 78. As shown in the drawing, portion 112 of the housing is threaded into the other portion of the housing and pressure adjusting shims 114 may be positioned between the end of the spring and the portion 112 of the housing. Also located around the stem 96 is a piston stop 116 which permits a predetermined amount of piston movement. The unloading valve is also provided with a discharge passage 118 in which is positioned a poppet valve 120 which is held in its seat by a light spring 122. A collar 124 is positioned around the end of the stem and contacts an extension 126 of the poppet valve to move it off its seat in operating condition. The arrangement is such that when the pressure at the inlet port 80 is not sufficient to overcome the action of the spring 108 the piston 84 will move toward the inlet end of the housing and the collar 124 will bear against the extension 126 of the poppet discharge valve 120 moving it off its seat opening the discharge valve 120, see FIG. 7. The housing 78 is provided with a passage 128 which communicates with the discharge passage 118. A line 130 connects the second passage 104 with the passage 128 whereby, when the valve 92 is closed, flow from the outlet port 102 will flow through the second port 104 through the line 130 and out through the discharge passage 118 and through check valve 132 to the atmosphere or sea. The check valve 132 prevents back flow. This will quickly discharge any fluid in the hydraulic operator 24 permitting the spring 26 to swiftly move the piston 20 to the other end of the operator thereby operating the valve within the required period of time. If for some reason the discharge passage 118 is blocked, the flow from the operator will flow through the outlet port 102 and will unseat the poppet valve 92 and will be permitted to flow back through the inlet passage to the pressure source and thereby the valve will operate, however, at a much slower rate because of the line friction restraining the return flow of the hydraulic fluid.

Both the pressure regulator 38 and the unloading valve 76 are so designed that they may be vented to atmosphere, sea water or if desired enclosed in a canister with the wellhead and operated against the pressure contained in the wellhead canister. These vents are 134 for the regulator 38 and 136 for the unloading valve 76. The vents 134 and 136 may contain a check valve or be connected to a pressure source within a wellhead canister.

As can be seen from the foregoing, the proposed control system shown in FIGS. 1 and 2 facilitates the completion of isolated wellheads and control of other isolated hydraulically operated valves. It provides a control system permitting the utilization of small single hydraulic line from a central control point distant from the valve to be operated. It utilizes an improved pressure regulator capable of operating with hydraulic fluid at relatively high pressure. The pressure regulator 38 is so designed that the regulator valve 54 remains open during pressure buildup, see FIG. 1. When the pressure at the outlet port 62 of the pressure regulator 38 exceeds the pressure set for operator function, the regulator valve 54 closes preventing any further buildup of pressure to the operator, see FIG. 4. Accordingly, it is only necessary for the operator 24 to be designed to handle the pressure range required for operation of the valve that it is controlling. The pressure regulator is so designed that the pressure at the outlet port 62 can be regulated over the range normally required by high pressure hydraulic operators. In addition the pressure regulator 38 is provided with a relief valve 56 which will function in the event that the regulator valve 54 leaks. In such event, any excess pressure will be discharged out of the regulator affording further protection to the hydraulic operator 24. Again the pressure regulator 34 is so designed that the pressure at which the relief valve 56 will open can be independently set. The pressure regulator is also provided with a port 134 which permits the internal housing to be vented to either the atmosphere, sea water or an independent pressure source. In the line between the pressure regulator 38 and hydraulic operator 24 is the unloading valve 76 which has two primary functions. One, during pressure buildup and operation, the unloading valve 76 receives the pressure from the regulator 38 and transmits it to the hydraulic operator 24, see FIG. 1. Second, upon decrease of pressure beyond a set point, the discharge valve 120 is opened dumping the hydraulic fluid in the operator 24, see FIG. 2. Since hydraulic fluid is in effect incompressible, the relieving of a very small amount of fluid, by moving the 3-way control valve 37 to discharge, will relieve the pressure in the unloading valve 76 which will close the valve 92 allowing the spring 108 to return the piston 84 and open the discharge valve 120 which will dump the hydraulic fluid in the operator 24 expeditiously. Such action permits fast action of the valve 10 by the spring 26. If the hydraulic fluid in the cylinder 22 is not dumped close to the operator 24, there will be a lag in operation as the line function of the fluid returning in the long line will substantially retard movement of the piston 20. However, as a safety feature the unloading valve 76 is so designed that if the discharge passage 118 is blocked or the discharge valve 120 becomes inoperative, the valve 92 is unseated and the hydraulic fluid can flow back to the pressure source 36 where it can be discharged. As mentioned, this would drastically lengthen the time required for operation of the valve 10 and is only to be considered as an emergency means. As with the pressure regulator 38, the unloading valve 76 is provided with means to permit adjustment of pressures and venting.

The control system of the present invention provides a means of facilitating operation of remotely located hydraulically operated valves permitting use of an inexpensive small single control line yet at the same time insuring that the operator receives only the required pressure and assure fast return operation by dumping the hydraulic fluid in the operator near the operator eliminating time lag due to line friction.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A pressure regulator for a control system for a hydraulically operated valve, said regulator comprising: a housing formed of two generally cylindrical sections which are adjustably secured to each other by means of mating threads; the first section having an inlet port which is in communication by a passage with a cylindrical chamber in which is positioned a piston, a poppet regulator valve in the passage between the inlet port and the cylindrical chamber, a poppet relief valve in the piston, the relief valve having a portion normally contacting and holding open the regulator valve, an outlet port in communication with the cylindrical chamber; the second section having a spring which bears against the piston and a central member which contacts the relief valve in the piston, the central member having a discharge passage, the magnitude of spring being adjustable by positioning of the two sections relative to each other whereby the regulator valve remains open until the pressure in the cylindrical section overcomes the magnitude of the spring at which time the relief valve moves out of contact with the regulator valve closing the regulator valve; upon any further increase in pressure in the cylindrical chamber the piston moves further into the chamber and the relief valve contacts the central member and relieves excess pressure through the discharge passage in the central member.

2. A pressure regulator for a control system for a hydraulically operated valve, said regulator comprising: a housing formed of two generally cylindrical sections which are adjustably secured to each other; the first section having an inlet port which is in communication by a passage with a cylindrical chamber in which is positioned a piston, a regulator valve in the passage between the inlet port and the cylindrical chamber, a relief valve in the piston, the relief valve having a portion normally contacting and holding open the regulator valve, an outlet port in communication with the cylindrical chamber; the second section having a spring which bears against the piston and a central member which contacts the relief valve in the piston, the central member having a discharge passage, the magnitude of spring being adjustable whereby the regulator valve remains open until the pressure in the cylindrical section overcomes the magnitude of the spring at which time the relief valve moves out of contact with the regulator valve closing the regulator valve; upon further incremental increase in pressure in the cylindrical chamber the piston moves further into the chamber and the relief valve contacts the central member and relieves excess pressure through the discharge passage in the central member.

3. A pressure regulator for a hydraulic system having first and second sections being adjustably secured one to the other, said first section being formed to define a piston chamber, a piston positioned for reciprocation in the piston chamber, an inlet port formed in the first section, a passageway connecting the inlet port and the piston chamber, a regulator valve disposed in the passageway and being normally biased to a position closing said passageway, a bore formed in the piston and being aligned with the passageway, a relief valve positioned in the piston bore and being movable between open and closed positions relative to the piston bore, an outlet port formed in the first section and being in communication with the piston chamber, a spring disposed in said second section, a collar positioned on the spring and being biased by the spring into engagement with the piston, a central member positioned for reciprocation within the second section and having one end thereof sealingly received within the second section and the other end thereof sealingly received within the piston bore, said other end adapted to contact the relief valve and to move the relief valve to its open position, a discharge passage formed in the central member.

4. A pressure regulator for a hydraulic system having first and second sections being adjustably secured one to the other, said first section being formed to define a piston chamber, a piston positioned for reciprocation in the piston chamber, an inlet port formed in the first section, a passageway connecting the inlet port and the piston chamber, a regulator valve disposed in the passageway and being normally biased to a position closing said passageway, a bore formed in the piston and being aligned with the passageway, a relief valve positioned in the piston bore and being movable between open and closed positions relative to the piston bore, the relief valve having a portion normally contacting and holding open the regulator valve, an outlet port formed in the first section and being in communication with the piston chamber, a spring disposed in said second section, a collar positioned on the spring and being biased by the spring into engagement with the piston, a central member positioned for reciprocation within the second section and having one end thereof sealingly received within the second section and the other end thereof sealingly received within the piston bore, said other end adapted to contact the relief valve and to move the relief valve to its open position, a discharge passage formed in the central member, a check valve normally closing the outlet of the discharge passage.

5. A pressure regulator for a hydraulic system having first and second sections in telescoping relation and being adjustably secured one to the other, said first section being formed to define a piston chamber, a piston positioned for reciprocation in the piston chamber, an inlet port formed in the first section, a passageway connecting the inlet port and the piston chamber, a regulator valve disposed in the passageway and being normally biased to a position closing said passageway, a bore formed in the piston and being aligned with the passageway, a relief valve positioned in the piston bore and being movable between open and closed positions relative to the piston bore, the relief valve having a portion normally contacting and holding open the regulator valve, an outlet port formed in the first section and being in communication with the piston chamber, a spring disposed in said second section, a collar positioned on the spring and being biased by the spring into engagement with the piston, stop means engageable by said collar for limiting movement of said spring, a central member positioned for reciprocation within the second section and having one end thereof sealingly received within the second section and the other end thereof sealingly received within the piston bore, said other end adapted to contact the relief valve and to move the relief valve to its open position, a discharge passage formed in the central member, a check valve normally closing the outlet of the discharge passage.

6. A pressure regulator comprising a housing formed of two telescoping sections which are adjustably secured one to the other, the first section having an inlet port and a chamber, a passage in the first section connecting the inlet and the chamber, a regulator valve positioned in the passageway and adapted to close the same, a piston having a bore formed therein positioned for reciprocation within the chamber, a relief valve positioned in the piston bore for controlling the flow of fluid through the piston bore, a regulator valve operating means normally contacting and holding open the regulator valve, an outlet port formed in the first section and being in communication with the chamber, the second section having a spring which bears against the piston and a central member adapted to contact the relief valve in the piston bore, a discharge passage formed in the central member, means in the discharge passage permitting the flow of fluid in one direction only, the magnitude of the spring being adjustable whereby the regulator valve remains open until the pressure in the first section overcomes the magnitude of the spring at which time the regulator valve operating means moves out of contact with the regulator valve allowing the regulator valve to close, upon further incremental increase in pressure in the chamber the piston will be moved further toward the spring causing the relief valve to be engaged and moved to its open position by the central member to allow the excess pressure to be relieved through the discharge passage.

7. A pressure regulator for controlling the pressure of a fluid medium, said regulator comprising: a housing formed of two generally cylindrical sections which are adjustably secured to each other; the first section having a cylindrical chamber formed therein and having an inlet port which is in communication by a passage with the chamber, a piston movably disposed within the chamber, a regulator valve in the passage between the inlet port and the chamber, a relief valve in the piston in alignment with said regulator valve and normally contacting and holding open the regulator valve, an outlet port in communication with the chamber; the second section having a spring which bears against the piston and normally biasing the regulator valve open and the relief valve closed, a central member positioned to contact the relief valve in the piston, a discharge passage in said second section, the magnitude of the spring being adjustable by adjusting said cylindrical sections whereby the regulator valve remains open until the pressure in the section overcomes the magnitude of the spring at which time the relief valve carried by said piston moves out of contact with the regulator valve closing the regulator valve; upon further incremental increase in pressure in the chamber the piston moves further into the chamber and the relief valve contacts the central member and relieves excess pressure through the discharge passage.

References Cited by the Examiner

UNITED STATES PATENTS 2,963,040 12/60 Zimmer _____ 137—116.5 XR
2,994,334 8/61 Loveless _____ 137—116.5 XR

FOREIGN PATENTS 724,263 1/32 France.

ISADOR WEIL, *Primary Examiner.*